United States Patent
Armstrong et al.

(10) Patent No.: US 9,703,523 B1
(45) Date of Patent: Jul. 11, 2017

(54) ADJUSTING AUDIO VOLUME BASED ON A SIZE OF A DISPLAY AREA

(71) Applicant: International Business Machines Corporation, Armonk, NY (US)

(72) Inventors: Lisa K. Armstrong, Austin, TX (US);
Kathleen M. Garitty, Austin, TX (US);
Michelle A. Mandel, Austin, TX (US);
James H. Royal, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/988,232

(22) Filed: Jan. 5, 2016

(51) Int. Cl.
*H03G 3/00* (2006.01)
*G06F 3/16* (2006.01)
*G06F 3/14* (2006.01)

(52) U.S. Cl.
CPC ............ *G06F 3/165* (2013.01); *G06F 3/1423* (2013.01)

(58) Field of Classification Search
CPC . H04R 25/00; H04R 5/02; H04R 3/12; H04R 2499/15; H04R 1/1041; H04R 1/1083; H04R 5/033; H04R 29/001; H04R 29/008; H04R 29/007; H04R 29/002; G06F 3/00; G06F 3/165; G06F 3/1423; G06F 17/00; G06F 9/00; G06F 2203/0339; G06F 2203/0381; G06F 2203/0382; G06F 2203/04101; G06F 2203/04103; G06F 2203/04104; G06F 2203/04107; G06F 2203/04112; G06F 2203/04803; G06F 2203/04809; G06F 1/1618; G06F 1/1677; G06F 3/0488; G06F 2009/3883; G06F 2009/45562; G06F 2009/45566; G06F 2009/4557; G06F 2009/45575; G06F 2009/45579; G06F 2009/45583; G06F 2009/45587; G06F 2009/45591; G06F 2009/45595; G06F 2003/0691; G06F 2003/0692; G06F 2003/0694; G06F 2003/0695; G06F 2003/0697; G06F 2003/0698; H04M 2250/02; H04M 1/05; H04M 1/0237; H04M 1/0239;

(Continued)

(56) References Cited

U.S. PATENT DOCUMENTS 7,844,354 B2  11/2010  Keohane et al.
2008/0165992 A1*  7/2008  Kondo .............. H04N 7/0122
                                                        381/182

(Continued)

*Primary Examiner* — Leshui Zhang
(74) *Attorney, Agent, or Firm* — Patterson + Sheridan, LLP (57) ABSTRACT

Embodiments herein adjust speaker volume according to a predefined volume level assigned to a display device that displays an application generating audio output. In one example, the display device is assigned a volume level that is a function of the size of its display area. When an application displayed on the monitor begins to output audio, the audio is outputted using the volume level assigned to the monitor. If a computing system includes multiple display devices, the computing system automatically changes the volume setting of a speaker as the application outputting the audio is moved from one display device to another. Once the application moves from a first display device to a second display device, the computing system automatically adjusts the speaker volume to the volume level assigned to the second display device.

20 Claims, 5 Drawing Sheets

(58) Field of Classification Search
CPC ............ H04M 1/0216; H04M 1/2155; H04M
1/2474; H04M 1/6066; H04M 3/62;
H04M 2203/6018; H04M 2203/6045;
H04M 1/0214; H04M 1/72522; H04M
1/72583; H04M 1/0245; H04M 2250/22;
H04M 2250/16; H04M 1/72552; H03G
7/00; H04N 13/00; H04S 7/00
USPC .......... 381/300, 306, 61, 104–110, 116, 117,
381/118, 119, 120, 123, 333, 334, 59,
381/302, 86; 345/177, 158, 156, 157,
345/159, 173; 455/420, 556.1, 575.2,
455/575.3, 575.4; 700/94; 348/800;
715/762
See application file for complete search history.

(56) References Cited

U.S. PATENT DOCUMENTS

| | | | |
|---|---|---|---|
| 2010/0293468 A1 | 11/2010 | Thijssen | |
| 2010/0302179 A1* | 12/2010 | Ahn | G06F 1/1618 |
| | | | 345/173 |
| 2014/0340334 A1* | 11/2014 | Cho | G06F 3/013 |
| | | | 345/173 |

* cited by examiner

ADJUSTING AUDIO VOLUME BASED ON A SIZE OF A DISPLAY AREA

BACKGROUND

The present invention relates to automatically setting audio volume based on the selected display device, and more specifically, to adjusting the audio volume by determining which display device displays an application generating audio output.

SUMMARY

One embodiment of the present invention is a computing system that includes a first display device assigned a first volume level and a second display device assigned a second volume level, where a display area of the first display device is different than a display area of the second display device and the first and second volume levels are a function of the display areas of the first and second display devices. The computing system also includes a computing device configured to display an application on the first display device, wherein the application generates audio output and, upon determining the application is displayed on the first display device, output the audio output at the first volume level. The computing device is also configured to, upon determining the application has moved from the first display device to the second display device, output the audio output at the second volume level, wherein the second volume level is different from the first volume level.

Another embodiment of the present invention is a method for displaying an application that generates audio output on a first display device, where the first display device is assigned a first volume level. The method also includes, upon determining the application is displayed on the first display device, outputting the audio output at the first volume level. The method includes, upon determining the application has moved from the first display device to a second display device, outputting the audio output at a second volume level assigned to the second display device, where a display area of the first display device is different than a display area of the second display device and the first and second volume levels are a function of the display areas of the first and second display devices.

Another embodiment of the present invention is a system that includes a computer processor and a memory containing a program that, when executed on the computer processor, performs an operation for processing data. The operation includes displaying an application that generates audio output on a first display device, where the first display device is assigned a first volume level. The operation includes, upon determining the application is displayed on the first display device, outputting the audio output at the first volume level. The operation includes, upon determining the application has moved from the first display device to a second display device, outputting the audio output at a second volume level assigned to the second display device, where a display area of the first display device is different than a display area of the second display device and the first and second volume levels are a function of the display areas of the first and second display devices.

BRIEF DESCRIPTION OF THE SEVERAL VIEWS OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments herein adjust speaker volume according to a predefined volume level assigned to a display device that displays an application generating audio output. In one example, the display device is assigned a volume level that is a function of the size of its display area. For example, a 30 inch monitor may be assigned a higher volume level than a 20 inch monitor. When an application displayed on the monitor begins to output audio, the audio is outputted using the volume level assigned to the monitor. For example, if the monitor is assigned a 70% volume level—e.g., 70% maximum volume of a speaker—when an application displayed on the monitor begins to output audio, the speaker volume control is automatically (i.e., without user prompt) set to 70% of its maximum volume.

In one embodiment, a computing system may include multiple display devices. For example, a computing device may be coupled to two external monitors, or a laptop may be coupled to a projector. The computing system may automatically change the volume setting of a speaker as the application outputting the audio is moved from one display device to another. For example, multiple display devices may share a common desktop which permits the user to move applications between display areas in the display devices. When the application begins to output audio while on a first display device, the computing device sets the volume setting of the speaker using the volume level assigned to the first display device. However, once the application moves to a second display device, the computing system automatically adjusts the volume of the speaker to the volume level assigned to the second display device. For example, the user may drag the application from the integrated screen on a laptop to a display area generated by a projector. Because the display area of the projector is larger and may be intended to be viewed by a large group of people, the volume level assigned to the projector may be larger (e.g., 90% of the maximum speaker volume) than the volume level assigned to the integrated display in the laptop (e.g., 40% of the maximum speaker volume).

Figure 1:
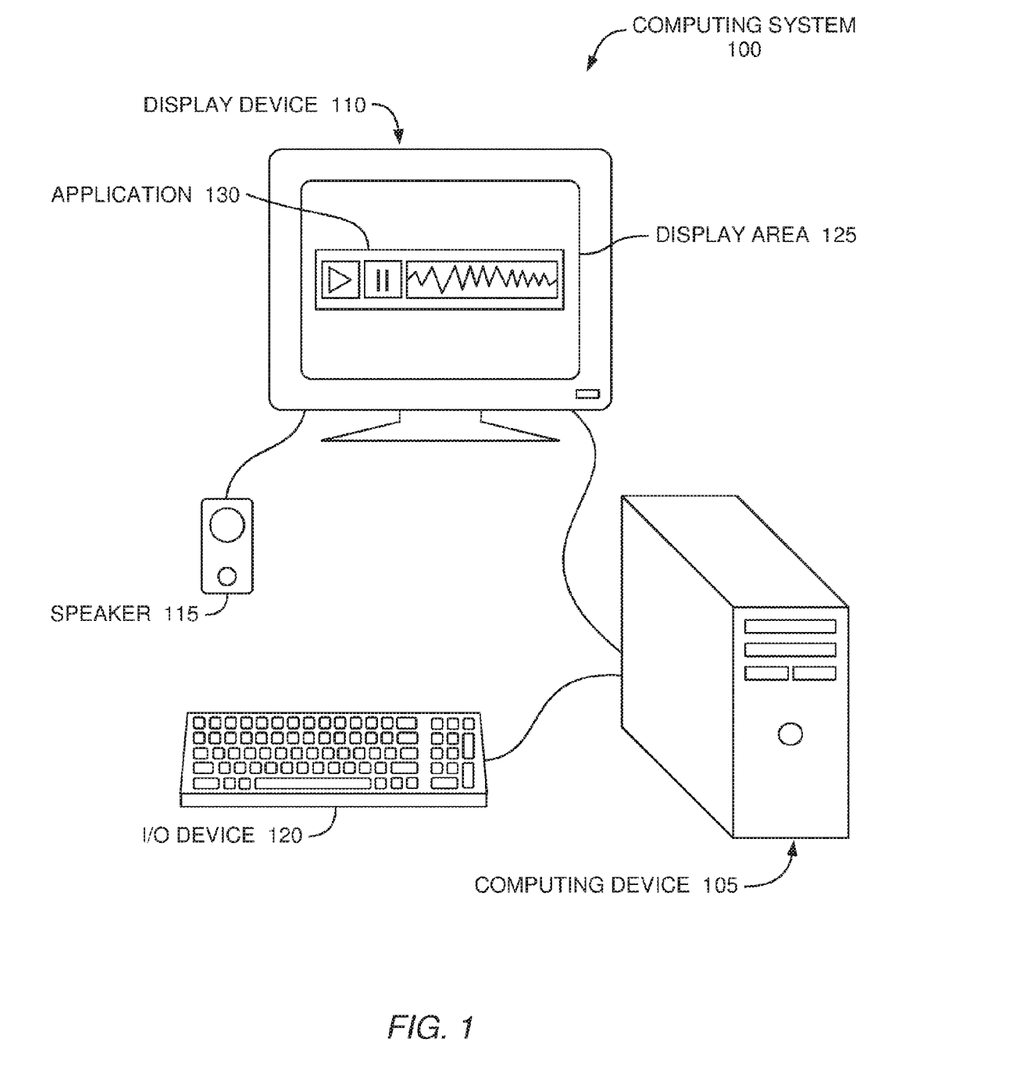
FIG. 1 illustrates a computing system that adjusts audio volume according to a predefined volume level assigned to a display device, according to one embodiment described herein.

FIG. 1 illustrates a computing system 100 that adjusts audio volume according to a predefined volume level assigned to a display device, according to one embodiment described herein. The computing system 100 includes a computing device 105, display device 110, speaker 115, and input/output device 120. Although in FIG. 1 the computing device 105 is shown as a desktop computer, in other embodiments, the device 105 may be a server, laptop, tablet, smartphone, and the like. The computing device 105 may include one or more processors that each includes one or more processing cores. The computing device 105 may also include memory which stores an operating system that executes one or more user applications—e.g., application 130.

In computing system 100, the computing device 105 controls the images displayed in a display area 125 of the display device 110. In this example, the display device 110 is a monitor external to the computing device 105. Put differently, the display device 110 is a standalone unit that is external to a body or form factor of the computing device 105. The display device 110 can be communicatively coupled to the computing device 105 using a wire (e.g., a cable) or via wireless communication. The computing device 105 may include a graphics card which provides updated display frames to the display device 110 for display. In FIG. 1, the display area 125 displays a graphical user interface (GUI) of an application 130 executing in the computing device 105.

The GUI of application 130 may include one or more user interactive elements (e.g., buttons, slide bars, text boxes, and the like) that permit the user to control the application 130. To do so, the user may manipulate the I/O device 120 (e.g., a keyboard, mouse, trackball, touch screen, touch pad, voice recognition system, and the like) to provide instructions. For example, the user may activate pause or play buttons in the GUI that start or stop the application 130 from outputting audio. In another example, the user instructs the computing device 105 to begin executing the application 130, and in response, the application 130 automatically begins to generate audio. In the embodiments herein, the application 130 may be any computing application that generates audio which is outputted by a speaker 115. For example, the application 130 may be a media player, a video game, streaming video application, MP3 player, document editor with audio feedback, and the like.

Although one speaker 115 is shown, the computing system 100 may include any number of speakers. Moreover, the speaker 115 may be a standalone speaker or integrated into one of the other components in the computing system 100—e.g., display device 110 or computing device 105. As described in more detail below, once the application 130 begins to generate audio output, the computing device 105 automatically adjusts the volume setting of the speaker 115 to a volume level assigned to the display device 110. That is, instead of requiring the user to set the volume for the audio, the computing device 105 does this automatically using the volume level previously assigned to the display device 110.

Figure 2:
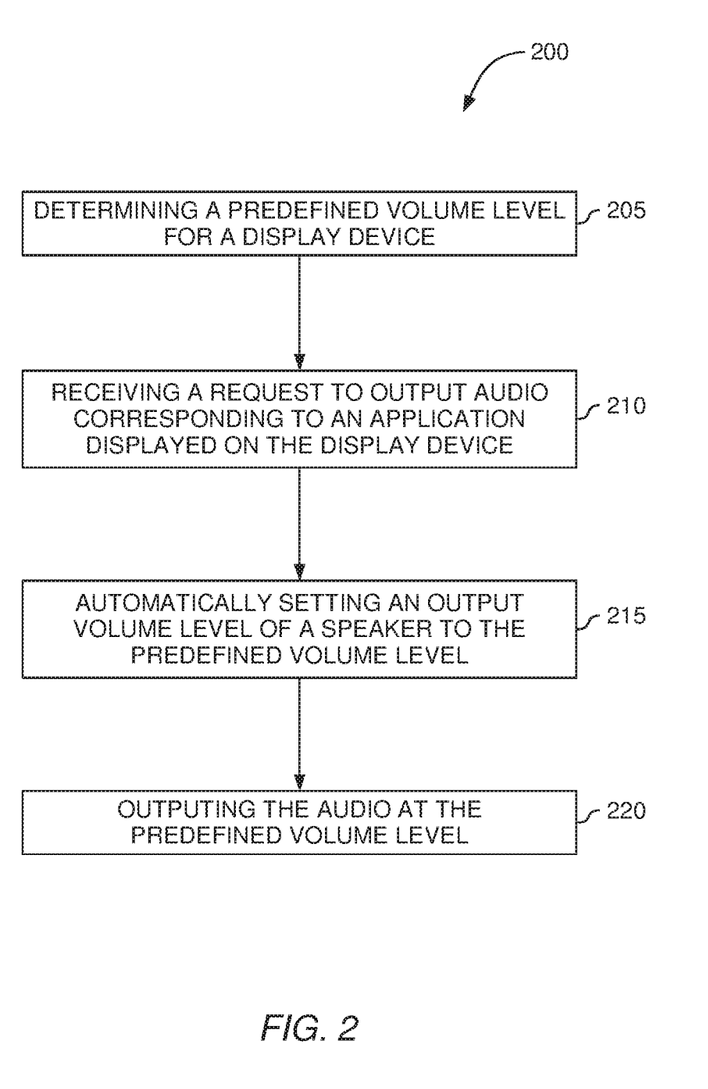
FIG. 2 is a flowchart for adjusting audio volume according to a predefined volume level assigned to a display device, according to one embodiment described herein.

FIG. 2 is a flowchart of a method 200 for adjusting audio volume according to a predefined volume level assigned to a display device, according to one embodiment described herein. At block 205, the computing system determines a predefined volume level for a display device. In one embodiment, the computing system determines the volume level using the size of the display area of the display device. In one embodiment, the computing system stores a lookup table or uses a predefined algorithm that determines the volume level of display device using the display area of the device as the input. For example, a monitor with a 20 inch display area (as measured from one corner to another corner) may be assigned a 40% volume level while a display device with a 32 inch display area is assigned a 60% volume level. If the display device is a projector (whose display area varies according to the distance between the projector and the surface on which the display area is projected) the computing device may first determine the display area of the projector. For example, the projector may include a depth sensor that indicates how far the projector is from the display surface which can be used to calculate the size of the display area projected on the surface. Alternatively, the computing device may assign a predefined volume level for a projector regardless of the size of its corresponding display area.

In one embodiment, the computing system determines the volume level for a display device according to the distance from the display device to the user. This may be useful if the speaker outputting the audio is co-located with the display device. As the user moves further from the display device, the computing system may assign greater volume levels to the device. Thus, even as the speaker (and the display device) moves further away from the user, the computing system can assign a volume level that ensures the audio outputted by the speaker can be heard by the user. To determine the volume level, the computing device may ask the user to provide an estimate of how far she is typically located from the display device. Alternatively, the computing system may include one or more sensors for automatically determining the distance between the user and the display device. For example, the computing system may include an image and/or depth camera on the display device which, along with a facial recognition program, identifies the user and determines the distance from the display device and the user. The computing system can determine the appropriate volume level for the display device using this distance measurement.

In one embodiment, the computing system dynamically changes the volume level assigned to the display device. For example, the computing system may continuously measure the distance between the user and the display device (which includes the speaker) and update the volume level. Thus, as the user moves her chair further from the speaker and display device, the computing system can increase the volume level for the display device.

In another embodiment, the computing system determines the volume level for a display device according to the quality or resolution of the display device. For instance, a high-resolution display device may typically be used to play video games, and as such, the volume settings for this display device may be higher than a lower resolution display device. In another example, different brands of display devices may be assigned different volume levels. For example, some brands of display devices may have integrated speakers that have different audio capabilities. Thus, to output the same volume, the brands with smaller speakers may need to output audio at a higher volume setting than brands that have larger (or more) speakers integrated into the display device. In another example, the computing system may assign different volume levels using the type of the display device—e.g., a monitor, screen in a mobile device, projector, etc.

The computing system may use only one of the factors discussed above or a combination of these factors to determine the volume level assigned to the display device. Using a weighting function, the computing system may use the size of the display area, the distance between the user and the display device, screen resolution, brand, type, and the like to determine the volume level for the display device. Put differently, the volume level may be determined using any number of factors.

In one embodiment, the user sets the volume level for the display device. That is, after hearing audio outputted from a speaker, the user may set the volume level for the display device. For instance, the user may adjust the speaker volume until the volume is at a desirable level and then set this volume as the volume level assigned to the display device. In another example, the computing device may automatically set the volume level assigned to the display device using any of the factors above. However, if the user does not like the volume level, she can use an I/O device to adjust the volume level.

At block 210, the computing device receives a request to output audio corresponding to an application displayed on the display device. Put differently, an application currently viewable to a user on the display device begins to generate audio for the user. The application may generate the audio in response to a user action such as the user pressing the play button, playing a video game, navigating to a webpage with video content, or starting up the application. In another example, the application may generate the audio automatically. For example, the application may output audio when an alarm or timer expires, or when an alert is triggered (e.g., a low-battery warning).

At block 215, the computing device automatically sets an output volume level of a speaker to the predefined volume level of the display device currently displaying the application. That is, the computing device determines whether the application is viewable on the display device, and if so, sets the volume of the speaker to the volume level set at block 205. Using FIG. 1 as an example, because application 130 is displayed by the display device 110, any audio generated by the application 130 is outputted from the speaker 115 at the volume level assigned to the display device 110.

At block 220, the speaker outputs the audio at the predefined volume level assigned to the display device. In one embodiment, the computing device sets the volume of the speaker to the volume level of the display device before the audio generated by the application is outputted by the speaker, but this is not a requirement. For example, in another embodiment, the speaker may begin to output the audio at its current settings until sometime later (e.g., less than a second) the computing device adjusts the volume of the speaker to the volume level assigned to the display device.

Figure 3:
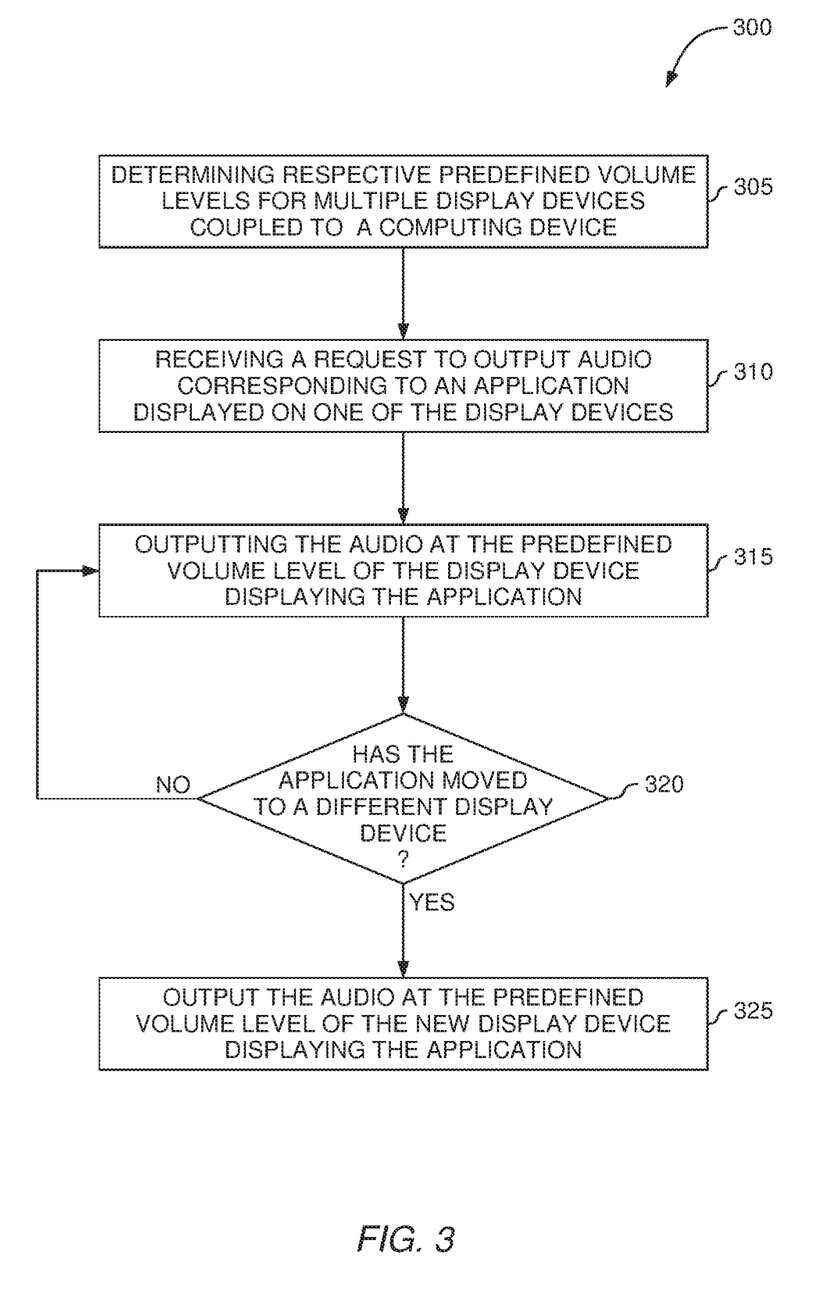
FIG. 3 is flowchart for adjusting audio volume when moving an application between display devices, according to one embodiment described herein.

FIG. 3 is flowchart of a method 300 for adjusting audio volume when moving an application between display devices, according to one embodiment described herein. Unlike method 200 in FIG. 2 where a computing system may include only one display device, the method 300 describes adjusting speaker volume in a computing system that includes multiple display devices.

At block 305, the computing system determines respective predefined volume levels for multiple display devices. These volume levels may be determined using any of the factors discussed above—i.e., size of the display area, the distance between the user and the display device, screen resolution, brand, type, and the like. For example, the computing device may evaluate the size of the display areas and the screen resolutions for each of the display devices to determine their respective volume levels. In this manner, the computing device may determine the volume level by evaluating the attributes of each display device individually.

In another embodiment, the computing system may compare the attributes of the display devices collectively. That is, instead of evaluating only the absolute value of the attributes of the display devices (e.g., their individual display area or distance from the user), the computing system may compare the attributes of the display devices to each other. For example, one of the display devices may include a display area that is 60% of the total display area of all the display devices combined, and thus, is assigned a volume level of 60% of the maximum speaker volume. Similarly, a display device that has a display area that is only 20% of the total display area would be assigned a volume level of 20% of the speaker. In this example, the qualitative size of the display area does not matter, but rather the contribution of the display area in the total display area of all the display devices in the computing system. Although this embodiment discusses comparing the size of display area, the same analysis could be performed using the distances from the display devices to the user where the individual distance of each of the display devices is compared to the total distances of all the display devices to the user.

In another example, instead of evaluating the total display area, the computing device may identify the display device with the largest display area and compare its display area to the display areas of the other display devices. For example, the display device with the largest display area (e.g., a projector) may be assigned the maximum volume level, i.e., 100% of the speaker volume. The other display devices in the computing system may be assigned volume levels using the following equation:

$$V_L = \frac{\text{display area of current display device}}{\text{display area of largest display device}} * V_{MAX} \quad (1)$$

where $V_L$ is the volume level for the current display device and $V_{MAX}$ is the maximum volume of the speaker. In equation 1, the display devices are assigned volume levels (i.e., $V_L$) in proportion to the size of the largest display area. Again, the actual qualitative sizes of the display areas may not matter, but rather the comparison between the display devices to the largest display device. For example, if the current display device has a display area that is 40% the size of the largest display area, the volume setting for the current display device is 40% of the maximum volume of the speaker. Although equation 1 lists comparing the display areas of the display devices, the same relationship could be made using the distances from the display devices to the user (or users).

In one embodiment, the computing device may evaluate the attributes of the display devices both individually and collectively. For example, the computing device may evaluate both the brand of each of the display devices as well as the comparison shown in FIG. 1 to determine the volume level for each of the display devices. The computing device may use a weighting function to combine these two factors to determine the volume levels for each of the display devices.

At block 310, a computing device receives a request to output audio corresponding to an application displayed on one of the display devices. For example, the application playing a video may be displayed on only one of the display devices coupled to the same computing device. As discussed in block 210 of FIG. 2, the application may generate the audio in response to a user action or automatically when, for example, an alarm or timer expires.

In one embodiment, the GUI of the application may span multiple display devices. For example, if the display devices share a common desktop, a first portion of the GUI may be displayed on a first display device while the remaining portion of the GUI is displayed on a second display device. However, the computing device may designate only one of the display devices as the device displaying the application. For example, the computing device may select the display device displaying the majority of the GUI (e.g., more than 50% of the viewable area of the GUI). Alternatively, the computing device may select the display device that includes the feature of the GUI that corresponds to the audio. For example, if the GUI displays a list of songs, the computing device may select the monitor displaying the current song being played as the designated monitor even if the majority of the GUI is displayed on another monitor.

At block 315, the computing device outputs the audio at the predefined volume level of the display device displaying the application. Put differently, the computing device sets the volume of the speaker to match the volume level of the display device displaying the application. If the application is displayed entirely on one display device, then the volume level of that device sets the speaker volume. If the application is displayed on two or more display devices, then whichever display device is designated as the display device is used to set the speaker volume.

In one embodiment, if the speaker volume is set to a different volume prior to outputting the audio at block 315, the computing device first adjusts the volume of the speaker to match the volume level assigned to the display device before the speaker outputs the audio. For example, if the speaker was not playing any audio previously, its volume may have been set at a predefined default volume. The computing device changes this default volume to the volume level assigned to the display device before the speaker outputs the audio.

In one embodiment, a single speaker (or a speaker system) may be tasked with outputting audio for applications that are displayed on two different display devices. For example, the user may want to play a video in a web browser displayed on a first monitor while listening to music provided by a MP3 player displayed on a second monitor. As such, the computing device may select which volume level to output the audio—i.e., the volume level of the first monitor or the second monitor. In one embodiment, the computing device may select the volume level of the display device that has most recently sent a request to begin output audio. Using the previous example, if the MP3 player on the second monitor was already playing music when the web browser on the first monitor began to play the video, the computing device selects the volume level of the first monitor as the speaker volume. Put differently, if the speaker volume was previously set to the volume level of the second monitor when playing the music generated by the MP3 application, the computing device changes the speaker volume to the volume level assigned to the first monitor when the video begins to play.

In another embodiment, the computing device assigns a priority to the different display devices. In this example, it may not matter which application begins outputting audio first, rather the computing device automatically sets (or maintains) the speaker volume at the volume level assigned to the highest-priority display device. However, in one embodiment, the user may override the volume level of the display device. For instance, if the user has changed the speaker volume for the audio already being outputted by the speaker, when new audio is sent to the speaker from an application displayed on the same or different display device, the computing device may maintain the speaker volume at the user-defined setting.

At block 320, the computing device determines if the application generating the audio has moved to a different display device. In one example, in an operating system that uses windows to display applications, the user may have moved the application's window to a different monitor. Alternatively, the computing device may move the application to a different monitor automatically (i.e., without user prompt). For example, the computing device may determine that a monitor has been unplugged from the computing device, and in response, moves all the applications being displayed in the unplugged monitor to another monitor connected to the computing device. In another example, the computing device may use a congestion threshold to automatically move applications to different display devices when one display device displays too many windows or has windows that overlap each other.

If the application remains within the display area of the same display device, method 300 returns to block 315—i.e., the speaker volume is not adjusted. However, if the computing device determines the application is now displayed in a different display device, method 300 proceeds to block 325 where the speaker outputs the audio at the predefined volume level of the new display device displaying the application. For example, if the speaker volume is 70% of its maximum when outputting the audio at block 315 but the volume level assigned to the new display device is 40%, the computing devices changes the speaker level from 70% to 40% of its maximum output. In this manner, the computing system dynamically adjusts the output of the speaker as the application generating the audio moves between display devices.

Figure 4A:
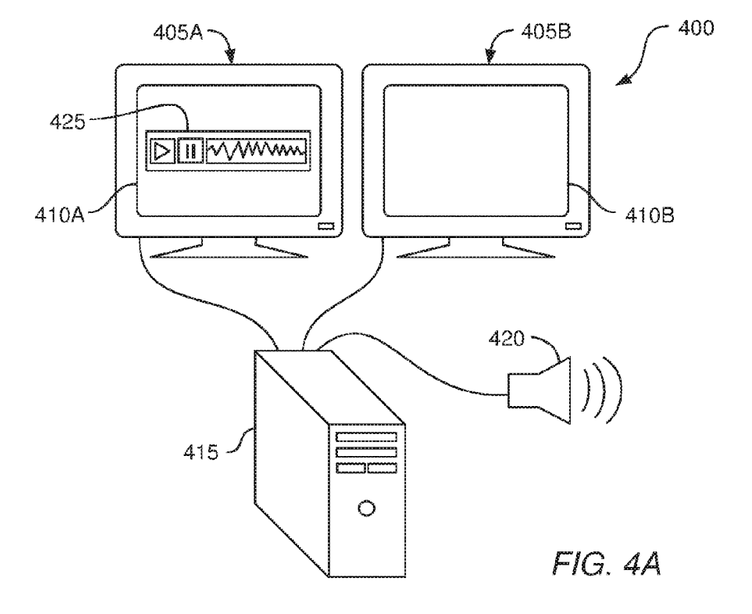
FIGS. 4A and 4B illustrate a computing system with multiple monitors, according to one embodiment described herein.
Figure 4B:
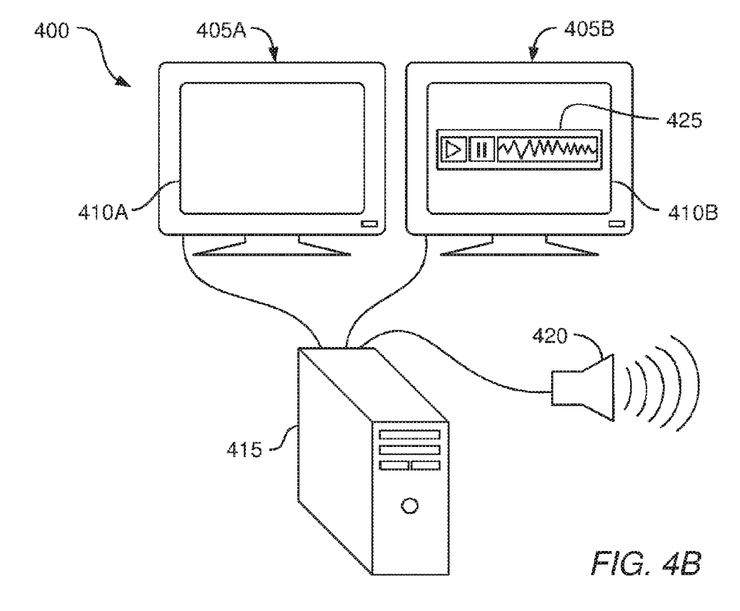

FIGS. 4A and 4B illustrate a computing system 400 with multiple monitors, according to one embodiment described herein. Computing system 400 includes two display devices (i.e., monitor 405A and monitor 405B) which share a common desktop which is provided by the operating system executing on the computing device 415. However, the embodiments herein may be used in computing systems where the monitors do not share a common desktop.

Specifically, FIG. 4A illustrates a point of time when an application 425 generating audio output is viewable within the display area 410A of monitor 405A. Although shown as being completely within the display area 410A, the application 425 may be partially displayed in both the monitors 405A and 405B. However, the computing device 415 may select only one of the monitors 405 as the designated display device—e.g., monitor 405A in this example. As above, the computing device 415 may select as the designated monitor the monitor which displays the majority of the application 425, or the monitor that displays the portion of the application 425 that corresponds to the audio output (e.g., a playlist).

The computing device 415 sets the volume of a speaker 420 to the volume level of the monitor 405A which displays the application 425. As described in methods 200 and 300, the computing system may set the volume level of the monitor 405A using the size of the display area, the distance between the user and the display device, screen resolution, brand, type, and the like. If, for example, the predefined volume level of the monitor 405A is 40%, then the speaker volume is initially set to this value. Of course, the user may change the volume of the speaker 420 manually if desired.

FIG. 4B illustrates the computing system 400 at a different point in time when the application 425 has moved from display area 410A to display area 410B. Once the computing device 415 determines the application 425 is now displayed in display area 410B, the device 415 changes the volume of the speaker 420 to the volume level corresponding to the monitor 405B. For example, the speaker volume may increase from 40% to 70% its maximum volume.

In one embodiment, the computing device 415 determines that the application 425 has moved from monitor 405A to monitor 405B once more than 50% of the displayable area of the application 425 is within display area 410B. Or the computing device 415 may change the volume of the speaker 420 once the portion of the application 425 corresponding to the audio output (e.g., the waveform indicating the sound frequency) is displayed in the display area 410B. Thus, the computing device 415 may change the volume of the speaker 420 to the volume level assigned to monitor 405B before the application 425 fully transfers from display area 410A to display area 410B.

Although FIGS. 4A and 4B illustrate using the same speaker 420 when outputting the audio for application 425, in other embodiments, the computing system 400 may use different speakers. Put differently, not only does the volume level of the audio change when the application 425 moves between monitors 405, but the speaker outputting the audio may also change. For example, the monitors 405 may both have integrated speakers. When the application is displayed on monitor 405A, the volume of its internal speaker is set to the volume level assigned to monitor 405A. When the user moves the application 425 to monitor 405B, the speaker in monitor 405A may stop outputting the audio generated by the application 425 and the speaker in monitor 405B begins outputting the audio. The volume of the speaker in monitor 405B would be set to the volume level assigned to monitor 405B.

Figure 5A:
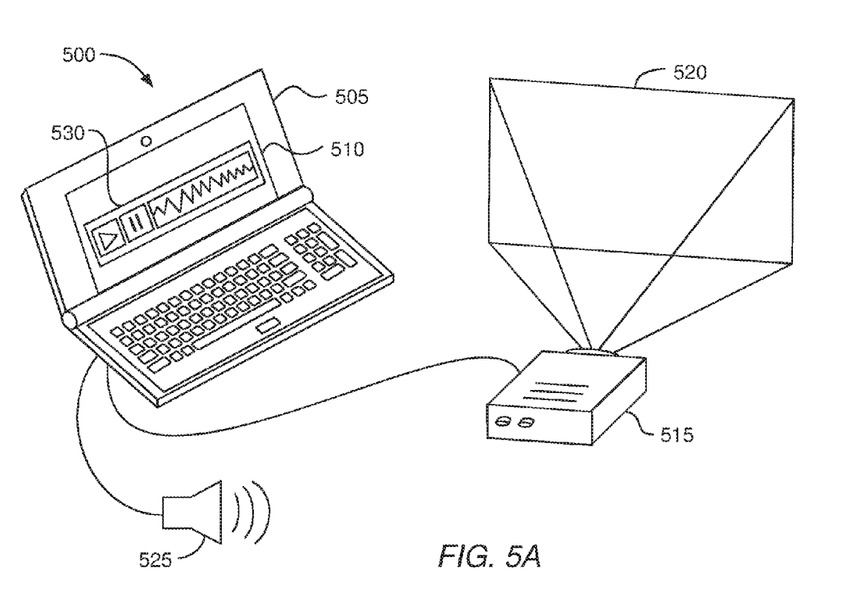
FIGS. 5A and 5B illustrate a computing system with internal and external display devices, according to one embodiment described herein.
Figure 5B:
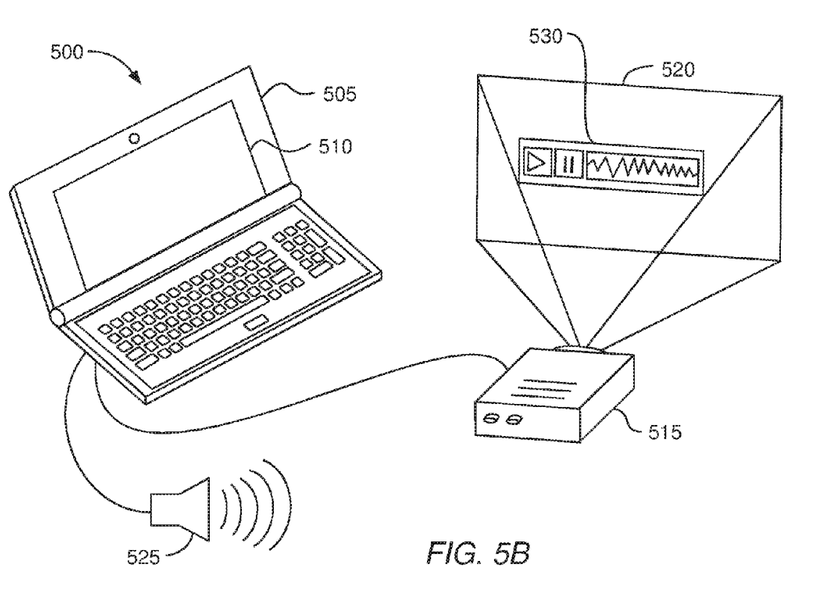

FIGS. 5A and 5B illustrate a computing system 500 with internal and external display devices, according to one embodiment described herein. As shown, the computing system 500 includes a mobile computing device 505 with an integrated display 510 communicatively coupled to an external display device 515. The computing system 500 also includes a speaker 525 for outputting audio generated by an application 530 executing on the computing device 505. The speaker 525 may be integrated into the form factor of the computing device 505 or may be a standalone speaker 525 that is communicatively coupled to the device 505.

As described in method 300, when an application 530 generating audio is displayed on the integrated display 510, the computing device 505 sets the volume of the speaker 525 to the volume level of the display 510. This volume level may be set based on the size of the display 510, the distance from the display 510 to the user, the proportional size of the display 510 relative to a display area 520 of display device 515, the resolution of the display 510, brand or type of the display 510, and the like. In one example, the volume level of display 510 may be less than the volume level assigned to the display area 515. This relationship may be desired since when the application 530 is viewable on the display 510, the application 530 is typically viewed by only one person who is near the computing device 505, but when the application 530 is displayed in the display area 520, the application 530 is viewable by multiple people who may be farther from the speaker 525.

FIG. 5B illustrates the computing system 500 at a different point in time when the application 530 is no longer viewable on display 510 but is instead displayed on the display device 515. In response, the computing device 505 adjusts the volume of the speaker 525 to the predefined volume level of the display device 515. Moreover, the computing system 500 may use multiple speakers to output the audio output, or the system 500 may use different speakers to output the input depending on which display device displays the application 530.

In one embodiment, the connection from the laptop (i.e., mobile computing device 505) to the external display device 515 is a wired or wireless connection. In one example, the laptop may communicate wirelessly with an intermediate computing device (e.g., a media player or consumer electronic device) that has a wired connection to the display device 515 (e.g., a television). The intermediate computing device may expand the capabilities of the display device 515 so that it can communicate with the computing device 505 to display the application 530.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computing system, comprising:
   a first display device assigned a first volume level;
   a second display device assigned a second volume level, wherein a display area of the first display device is different than a display area of the second display device and wherein the first and second volume levels are set based on ratios between the display areas of the first and second display devices and a largest display area associated with the computing system;
   a computing device configured to:
      before setting the first and second volume levels, evaluating display devices associated with the computing system to identify the largest display area;
      display a graphical user interface (GUI) of an application on the first display device, wherein the application generates audio output when executed on the computing device,
      upon determining the GUI is displayed on the first display device, output the audio output at the first volume level, and
      upon determining the GUI has moved from the first display device to the second display device, output the audio output at the second volume level,
   wherein the second volume level is different from the first volume level,
   wherein the first display device is integrated into a form factor of the computing device while the second display device is external to the computing device.

2. The computing system of claim 1, wherein changing the audio output from the first volume level to the second volume level is performed automatically without a user manually adjusting a volume of the audio output.

3. The computing system of claim 1, wherein the computing device is configured to:
before outputting the audio output, receive a request to initiate the audio output, wherein the audio output is automatically set to the first volume level in response to the request and without a user manually adjusting a volume of the audio output.

4. The computing system of claim 1, further comprising:
a speaker communicatively coupled to the computing device, wherein the speaker is configured to output the audio output at both the first and second volume levels.

5. The computing system of claim 1, wherein the first display device comprises a display screen integrated into the computing device.

6. The computing system of claim 1, wherein the computing device is configured to:
determine respective distances between a user and the first and second display devices; and
adjust the first and second volume levels based on the respective distances.

7. The computing system of claim 1, wherein the second display screen is one of a standalone monitor and a projector communicatively coupled to the computing device.

8. The computing system of claim 7, wherein the computing device is one of a tablet computer, a laptop computer, and a smartphone.

9. A method, comprising:
evaluating display devices associated with a computing device to identify a largest display area;
displaying a GUI of an application that generates audio output on a first display device, wherein the first display device is assigned a first volume level, and wherein the application is executed on the computing device;
upon determining the GUI is displayed on the first display device, outputting the audio output at the first volume level, and
upon determining the GUI has moved from the first display device to a second display device, outputting the audio output at a second volume level assigned to the second display device, wherein a display area of the first display device is different than a display area of the second display device and wherein the first and second volume levels are set based on ratios between the display areas of the first and second display devices and the largest display area,
wherein the first display device is integrated into a form factor of the computing device while the second display device is external to the computing device.

10. The method of claim 9, wherein changing the audio output from the first volume level to the second volume level is performed automatically without a user manually adjusting a volume of the audio output.

11. The method of claim 9, further comprising:
before outputting the audio output, receiving a request to initiate the audio output, wherein the audio output is automatically set to the first volume level in response to the request and without a user manually adjusting a volume of the audio output.

12. The method of claim 9, further comprising:
determining respective distances between a user and the first and second display devices; and
adjusting the first and second volume levels based on the respective distances.

13. The method of claim 9, wherein the first display device comprises a display screen integrated into the computing device.

14. The method of claim 9, wherein the second display screen is one of a standalone monitor and a projector communicatively coupled to the computing device.

15. A system, comprising:
a first display device integrated into a form factor of a computing device;
a second display device external to the computing device, wherein the second display device is communicatively coupled to the computing device using at least one of a wired or wireless connection;
a computer processor in the computing device; and
a memory in the computing device, wherein the memory contains a program that, when executed on the computer processor, performs an operation for processing data, the operation comprising:
evaluating display devices associated with the computing system to identify a largest display area;
displaying a GUI of an application that generates audio output on the first display device, wherein the first display device is assigned a first volume level;
upon determining the GUI is displayed on the first display device, outputting the audio output at the first volume level, and
upon determining the GUI has moved from the first display device to the second display device, outputting the audio output at a second volume level assigned to the second display device, wherein a display area of the first display device is different than a display area of the second display device and wherein the first and second volume levels are set based on ratios between the display areas of the first and second display devices and the largest display area.

16. The system of claim 15, wherein changing the audio output from the first volume level to the second volume level is performed automatically without a user manually adjusting a volume of the audio output.

17. The system of claim 15, where the operation further comprises:
before outputting the audio output, receiving a request to initiate the audio output, wherein the audio output is automatically set to the first volume level in response to the request and without a user manually adjusting a volume of the audio output.

18. The system of claim 15, wherein the first display device is a display screen integrated into the computing device.

19. The system of claim 15, where the operation further comprises:
determining respective distances between a user and the first and second display devices; and
adjusting the first and second volume levels based on the respective distances.

20. The system of claim 15, wherein the second display screen is one of a standalone monitor and a projector.

* * * * *